ical Disclosure Bulletin, vol. 23, No. 8, Jan. 81 p. 3517/18.

Hanna et al. Underscoring Half–Indexed Characters IBM Tech. Discl. Bull. vol. 23, No. 9, Feb. 81 p. 4030/1.

Daniels et al. Optimization of Underscoring and Overstriking IBM Tech. Discl. Bull. vol. 26, No. 8, Jan. 84 p. 4374.

Franklin: Printing Underscore Characters and Storing IBM Tech. Discl. Bull. vol. 21, No. 6, Nov. 78, p. 2392/3.

Horst et al. Bidirectional Multiple Pitch Automatic Word Underscore. IBM Tech. Discl. Bull. vol. 21, No. 10 Mar. 79, p. 3910.

Moore: Uniform Word Underscoring in Propertionality Spaced Printer. IBM Tech. Discl. Bull. vol. 22, No. 6, Nov. 79, p. 2178/82.

Bohrer et al. True Half Indexing on a Raster Display IBM Tech. Discl. Bull. vol. 26, No. 3B Aug. 83 p. 1359/63.

Primary Examiner—Felix D. Gruber
Attorney, Agent, or Firm—Douglas H. Lefeve

United States Patent [19]

Berkland et al.

[11] Patent Number: 4,648,047
[45] Date of Patent: Mar. 3, 1987

[54] INTERACTIVE OPERATOR SELECTION OF ALTERNATIVE IMPLEMENTATIONS OF PRINTER FUNCTIONS

[75] Inventors: Philip T. Berkland, Leander; Allen W. Heath, Cedar Park; Grady K. Waddell, Austin, all of Tex.

[73] Assignee: International Business Machines Corporation, Armonk, N.Y.

[21] Appl. No.: 664,180

[22] Filed: Oct. 24, 1984

[51] Int. Cl.⁴ .......... G06F 3/09; G06F 15/02; B41J 5/30
[52] U.S. Cl. .......... 364/519; 364/523; 364/900; 400/3; 400/70; 400/279
[58] Field of Search .......... 364/200, 900, 519, 523; 400/3, 4, 5, 12, 17, 61, 62, 65, 70, 279

[56] References Cited

U.S. PATENT DOCUMENTS

| 3,912,065 | 10/1975 | Kashio | 400/17 |
| 4,057,849 | 11/1977 | Ying et al. | 364/200 |
| 4,491,933 | 1/1985 | Ursin et al. | 364/900 |
| 4,553,866 | 11/1985 | Demonte et al. | 400/279 X |
| 4,564,301 | 1/1986 | Ueno | 364/519 X |

FOREIGN PATENT DOCUMENTS 1487507 10/1977 United Kingdom ............ 364/900

OTHER PUBLICATIONS

Gutzmann: The Rapid Printer Typesetting Program Scriptor Applied Information (German) Jun. 1979 pp. 256/258.

BoBo et al. Partial Indexing on a Display, IBM Techni-

[57] ABSTRACT

A word processing program is configured to produce a series of examples, for operator examination, of alternative implementations of certain printer functions. By observing the printer performance and physical appearance during the printing of these examples, the operator interactively chooses one of a plurality of implementations for each of these functions. The operator choices of implementation are saved by the work processing program and subsequent printing is effected in accordance with the implementation chosen by the operator.

17 Claims, 7 Drawing Figures

THIS LINE SHOWS superscript AND subscript TEXT. ⌇ 51

THIS LINE SHOWS SUPERSCRIPT AND SUBSCRIPT TEXT. ⌇ 52

THIS LINE SHOWS SUPERSCRIPT AND SUBSCRIPT TEXT. ⌇ 53

INTERACTIVE OPERATOR SELECTION OF ALTERNATIVE IMPLEMENTATIONS OF PRINTER FUNCTIONS

DESCRIPTION

1. Cross Reference to Related Applications

U.S. patent application, Ser. No. 664,181, to A. W. Heath et al, filed Oct. 24, 1984, entitled "Table Driven Print Formatting", and assigned to the assignee of this invention.

2. Technical Field

This invention relates to document printing in general and more particularly to a technique enabling interactive operator selection of one of a plurality of demonstrated implementations of a particular printer function in a system including multiple techniques of implementation of the same printer function.

3. Background Art

Prior art word processing systems, whether stand alone or shared logic, were typically dedicated to the specific purpose of word processing rather than being general purpose data processing machines. The individual components connected together into a complete word processing system were usually totally compatible with each other, and in the great majority of cases, each of the components in such a system were made by the same manufacturer. The software or programs to drive the system were, similarly, created by the same manufacturer as that of the hardware.

With the rapidly increasing popularity of small computers, commonly referred to as "personal" computers, word processing capabilities have been created for these computer systems, along with new problems. In understanding these problems, some important differences between the configurations of typical personal computers and prior art word processing machines must be understood. In today's personal computer environment, it is quite possible that the computer system includes components from different manufacturers. A notable example of this is the fact that it is quite common to use a printer in a personal computer system that is neither manufactured by, nor otticially recommended for use by the manufacturer of the central processing unit of the personal computer.

In typical data processing operations, printer capability with the remainder of the personal computer system, including its software, has not been a problem because the printed output of data processing operations has been relatively unsophisticated, since the manner of expressing the printed data output on the page has not had overwhelming importance in data processing printing operations. However, in word processing operations, the aesthetics of the printed presentation of the words takes on substantially greater importance. Thus, there are better and more expensive "letter-quality" printers being demanded by many who use personal computers for word processing operations.

Word processing printing operations, as distinguished from data processing printing operations, have historically been significantly more complex in the implementation of certain printer functions. Additionally, these complex implementations of certain printer functions have varied from printer to printer. For example, one printer may accomplish the underscoring of a series of words separated by interword spaces (where it is desired to provide a continuous underscore of the group of words and the spaces therebetween) by responding to a "begin underscore" non-printing, control code in the data stream which precedes the first character of the first word in the sequence of words to be underscored. The last character in this sequence of words is then followed by an "end underscore" control code and the hardware or software control logic in the printer responds appropriately to these codes to provide underscoring of the text. When a "dumber" printer is used which does not respond to begin and end underscore controls, block underscoring of text in the manner described above can nevertheless be accomplished in a number of ways. For example, a computer program running in the central processing unit could be made aware of the fact that the "dumber" printer presently connected is not responsive to begin and end underscore control codes. The program could, alternatively, activate an underscore flag associated with each of the character codes and spaces in the sequence of words going to the printer to be underscored. As another alternative, at the end of the sequence of words to be block underscored, the printer could insert the appropriate number of backspaces and underscore codes to provide underscoring of the text in a three step process. More sophisticated versions of the latter approach could be employed including two pass printing of the line without indexing between passes.

The printing superscripts and subscripts and the printing of bold faced text involves problems analogous to those described above relative to the block underscoring of text. Some printers directly respond to control codes calling for characters following them to be printed as superscripts or subscripts or boldly, while other printers are incapable of explicitly responding to those control codes, although the printers may be responsive to other codes which can be sent to the printer in an appropriate sequence to cause performance of the desired operations. In the case of superscripts and subscripts, the printer may support forward and reverse half index capabilities or variable, fractional line indexing capabilities which can be used to print superscript and subscript characters in one or multiple printing passes. The printing of bold text by a printer not directly supporting this function might be accomplished by multiple printing passes of the text to be displayed boldly on the printed page, and possibly with slight displacement of the characters to be printed boldly.

Thus, in order that word processing computer programs correctly send the appropriate codes to a connected printer, it is necessary that these programs have knowledge of the functional capabilities of the printer. Having acquired this knowledge, it is known to indirectly implement the above-described special printing functions for a given computer, program, printer configuration. However, a given implementation may be aesthetically unacceptable. Or, performance may be unacceptable because of low throughput speed.

As an example of a performance problem, consider the printing of multiple pages having a large plurality of superscripts and subscripts. If the implementation involves a separate line printing pass for each level of text, printer throughput could be slowed remarkably, and possibly to an extent which would render it more desirable to accept less than the best appearance for greater speed which, in the case of superscripts and subscripts, could be accomplished by making the superscript and subscript text smaller characters in either the upper or lower limit within the same print line, as will be shown by way of example in the detailed description herein.

Thus, while prior art word processing programs have had some capability to drive printers that do not directly support some of the coded functions called for by the word processing data stream, no means has been available to automatically provide examples of the various implementations of special printer functions to the operator or to allow the operator to interactively choose the desired implementation of the printer function.

DISCLOSURE OF THE INVENTION

A word processing program including programming for providing printer functional operations according to data stored in a table is configured to produce a series of examples of the execution of certain printer functions for operator examination before a formal document printing operation is started. By observing the printer performance and physical appearance of the text or graphical data generated during the printing of this plurality of examples, the operator is able to intelligently choose one of a plurality of implementation techniques for each of these functions capable of implementation in more than one way. The operator choices of implementation are saved by the word processing program and subsequent printing of one or more jobs is effected in accordance with the implementation chosen by the operator.

The operator's choice of implementation may typically be different from one job to the next depending on the job contents. An implementation having a very significant performance impact may be acceptable in view of its highly desired appearance when it is apparent to the operator that the performance impact of executing the special function is minimal because of a minimal requirement within the document to execute that function. Alternatively, in cases in which the operator is aware of frequent needs for that function, it may be desirable to choose an implementation resulting in degraded appearance in view of the higher speed of that operation.

The foregoing and other objects, features, extensions, and advantages of the invention will be apparent from the following more particular description of preferred embodiments of the invention, as illustrated in the accompanying drawing.

BEST MODE FOR CARRYING OUT THE INVENTION

Figures 1, 5:
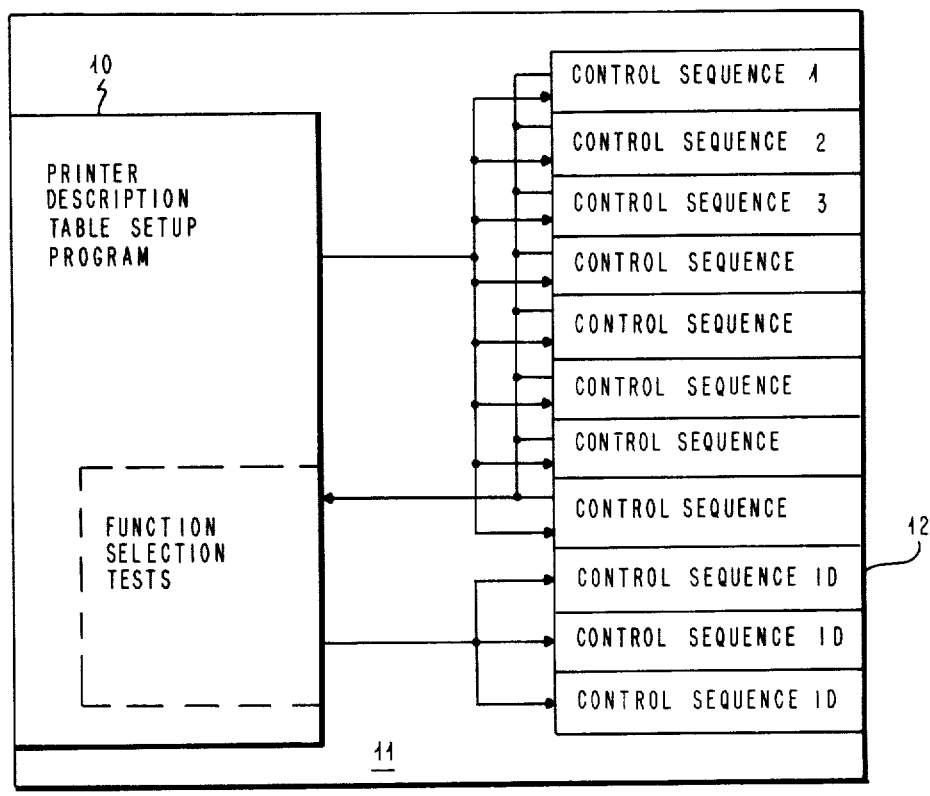
FIG. 1 is a block diagram which shows the data flow in establishing an operator preferred implementation of one or more printer functions.
FIG. 5 shows three lines of text examples printed according to alternative implementations of handling superscripts and subscripts.

Referring now to FIG. 1, a printer description table setup program 1 is utilized as part of a word processing program to enable a relatively unlimited variety of printers to be described which, in turn, allows the word processing data stream to be appropriately modified to enable correct printing of the text in the manner intended by the operator. Such a technique, including the details of the printer description table setup program 1 is described in detail in the above-referenced copending application Ser. No. 664,181. Using such a program 1, a plurality of control sequences 1, 2, and 3 are stored in a random access memory 11. The control sequences 1, 2, and 3 are particular programming routines, including data constants, as appropriate, to cause a particular special printer function to be implemented in a particular manner.

For example, refer now to FIG. 5 in which three lines of substantively identical text are represented in three different ways. In text line 51 it is apparent with regard to the words "superscript" and "subscript" that it was intended to have each of the characters of the words printed as superscript and subscript characters, respectively. In the data stream of the word processing program for this text the operator preceded the word "superscript" with a half index up instruction and immediately succeeded the word "superscript" with a half index down instruction. Similarly, the word "subscript" was immediately preceded and immediately succeeded by half index down and half index up instructions, respectively. Line 51 of the example text shown in FIG. 5 shows the operator that the particular printer attached to and being driven by program 1, is capable of responding to the half index up and half index down instructions of the text data stream and printing the text bounded by those control codes in accordance with line 51 of FIG. 5. However, although the presentation of the text by the printer as shown in line 51 may be the fastest way to print this text, it may also be less than the most aesthetically desirable presentation to the operator or reader.

Accordingly, program 1 is capable of providing alternative instructions and routines to the printer to enable a different, and perhaps aesthetically more desirable output. Line 52 of FIG. 5 depicts the printing of the same line of text as that printed in line 51 of FIG. 5. Before line 52 is printed, program 1 has provided for the replacement of the half index up and half index down instructions with forward and reverse half index control codes, which effectively commands the printer to respond literally to the operator's initial instructions, if the printer is capable of doing so. It is, therefore, immediately obvious in FIG. 5 that the printer does not support or respond to half index up and half index down control codes.

Referring back to FIG. 1, the control sequence including replacing half index up and half index down instructions with begin and end superscript and subscript control codes to be applied to the text for printing in the manner shown by line 51 of FIG. 5 is stored as control sequence 1 in the random access memory 11. Similarly, the control sequence whereby the half index up and half index down instructions are replaced by forward and reverse half index control codes is stored as control sequence 2 in the random access memory 11. Control sequence 3 stored in the random access memory 11 causes conversion of the half index up and half index down instructions to variable line spacing control codes. Accordingly, the text shown in line 53 of FIG. 5 has been printed in three passes, with the superscript text having been printed on the first pass, the main text having been printed with additional incremental indexing beyond the level on which the superscript text is printed, and the subscript text having been printed as another line with additional incremental indexing beyond the line on which the main text is printed.

Referring back to FIG. 1, after the control sequences 1, 2, and 3 have been established by the printer description table setup program 1 and have been stored in the random access memory 11, the function selection tests of program 10 are run which at this time results in the printing of the plurality of lines of identical characters as shown in FIG. 5. When this text is printed the operator is able to make judgments as to the relative speed of the printing and also with regard to the aesthetic quality of the particular manner in which the text is displayed by the printer. At this point the operator chooses how it is desired to handle the special printer function being demonstrated (in this example, the printing of superscript and subscript characters) and makes a choice which, in turn, causes the program 10 to store at location 12 of the random access memory 11, the identifier of the control sequence 1, 2, or 3 corresponding to the choice made by the operator. It should be noted that all control sequences continue to be saved in memory 11, even though only one was chosen to be the preferred implementation for printer operation. The saving of the non-chosen control sequences allows for a change in the operator's choice at a later time by replaying the example text for a different operator choice.

Figure 2:
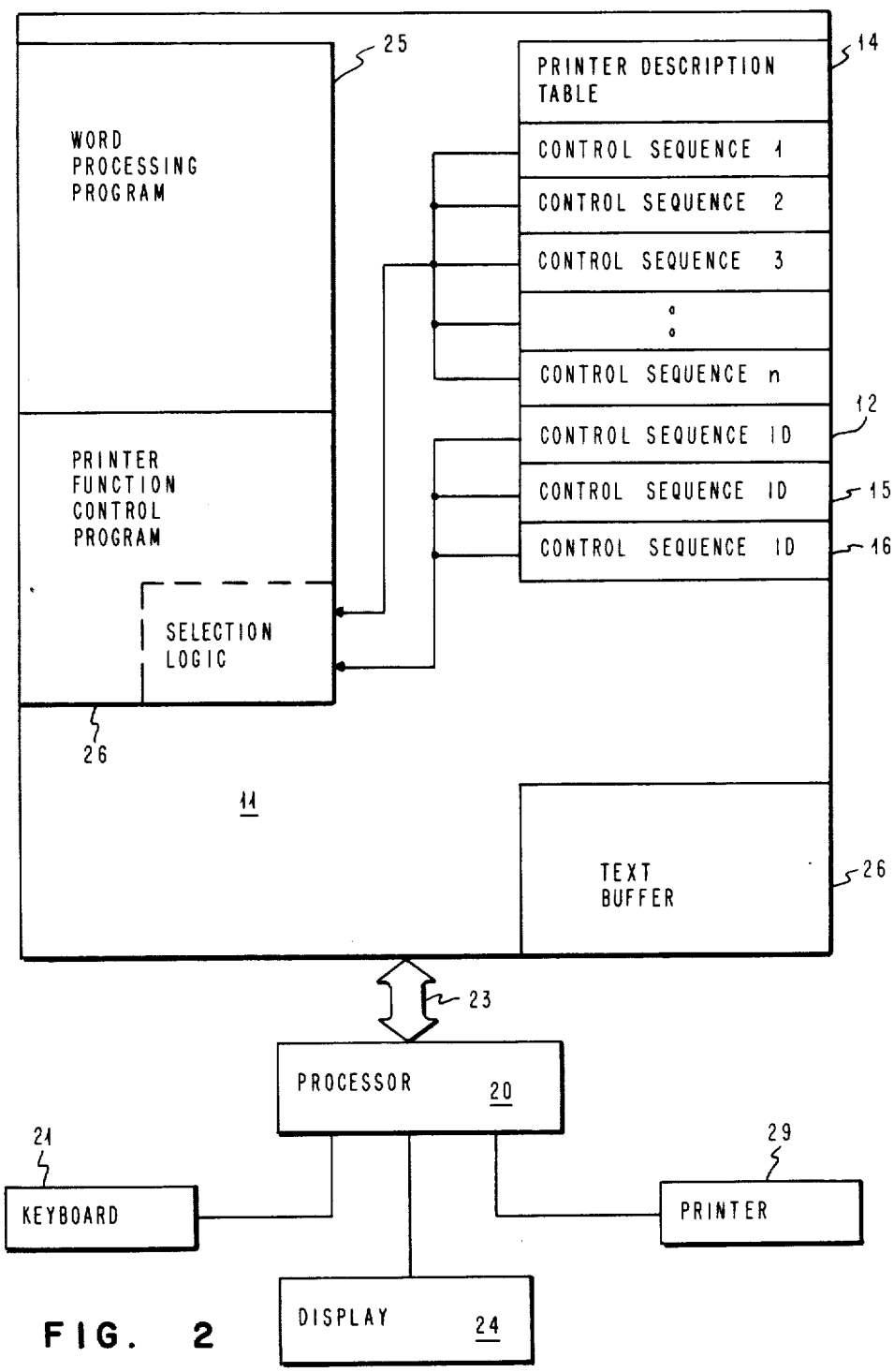
FIG. 2 is a block diagram which shows the data flow in a computer system which utilizes the operator selectable implementation of printer functions of this invention.

Referring now to FIG. 2, operation of a computer system utilizing this invention is described. The computer system includes a processor 20 which receives codes representative of text and control characters from a keyboard 21. The processor can store this text in the random access memory 11 by means of a system data bus 23 connected between the processor 20 and the random access memory 11. Concurrent with sending codes to the random access memory 11, the processor 20 may also communicate codes to a display 24 for depicting to the operator the codes keyed at keyboard 21.

In a word processing mode, text keyed at keyboard 21 and entered into the random access memory 11 is typically entered into memory 11 according to a word processing program 25 which is also stored in the random access memory 11. In accordance with this word processing program 25, the keyed text may, for example, be entered in area 26 of the random access memory 11. When printing of the text in area 26 of the random access memory 11 is desired, a printer function control program 26 (which program may be additional routines of or appended to program 25) is invoked to format the text stored in area 26 of the random access memory 11 before sending this text to the printer. This printer function control program 26 includes selection logic which receives a control sequence identifier (such as the one stored at location and described above with reference to FIG. 1.) and utilizes this identifier to select the appropriate control sequence, such as 1, 2, or 3, to provide proper formatting in implementing the special functions to by performed by a printer 29.

Figure 3:
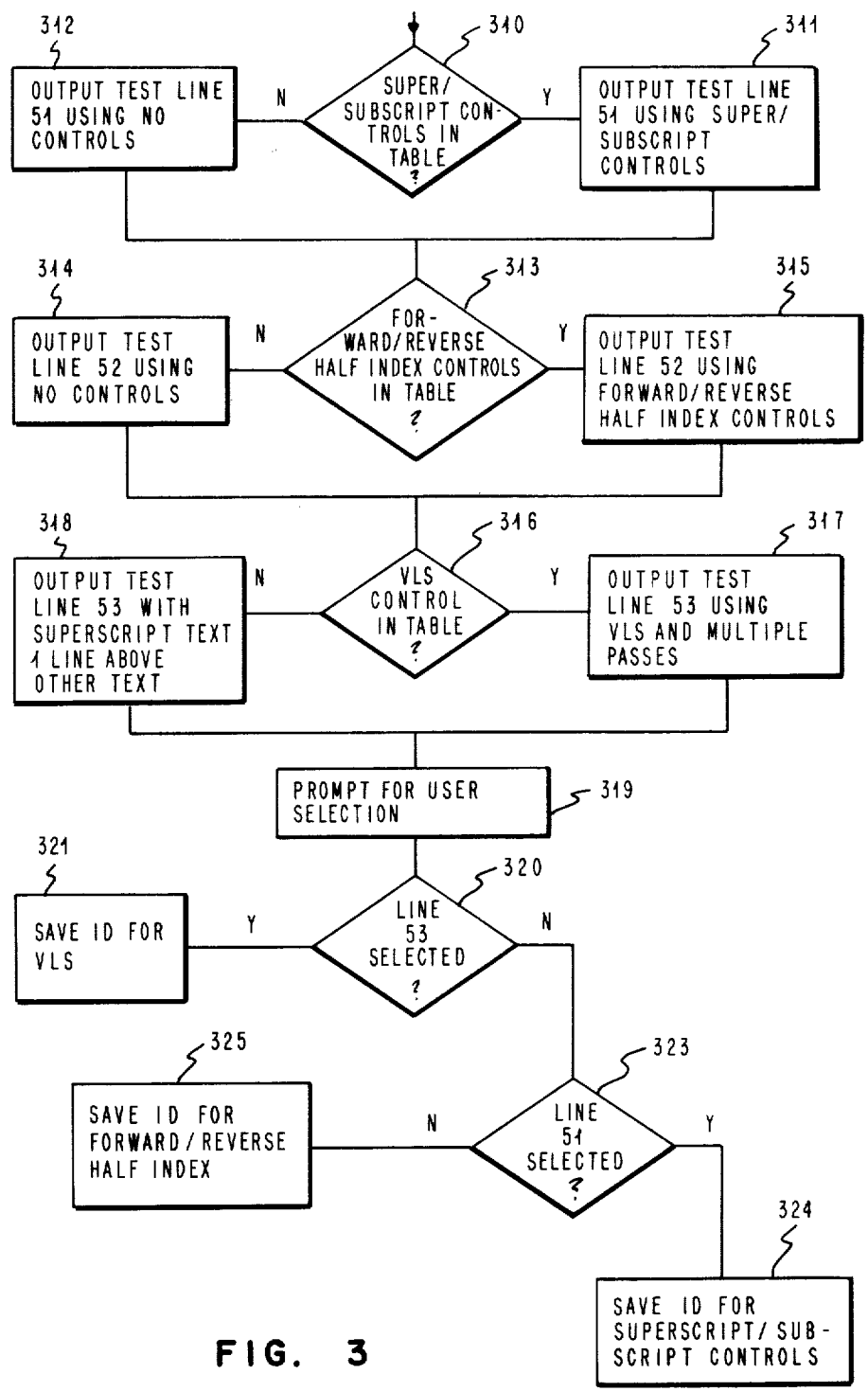
FIG. 3 is a programming flow chart which shows the establishment of alternative implementations of a particular printer function for storage and presentation to an operator for choosing a particular implementation of the printer function.

Referring now to FIG. 3, this programming flow chart shows the process for establishing and displaying alternative implementations of a particular printer function to an operator for choosing a particular implementation of the printer function. FIG. 3 should also be considered in view of the overall description of the implementation and operation of this invention relative to FIGS. 1, 2, and 5.

In FIG. 3, at 310 a printer description table is addressed to determine if the particular printer described by a printer description table 14 directly supports (responds to) superscript or subscript controls. If so, at 311 an output test line, such as text line 51 in FIG. 5, is printed by using superscript and subscript controls. If not, at 312 the same characters of text in the output test line are sent to the printer without the superscript and subscript controls. In either case the operation proceeds to 313, at which time the printer description table 14 is again consulted to determine if the chosen printer supports forward and reverse half index controls. If not, the line of text characters is output using no special controls for the superscript and subscript text. This is the situation relative to text line 52 of FIG. 5. If, however, the printer supports forward and reverse half index control codes, the line of text is output appropriately using those controls to provide the superscript and subscript printing functions.

Similarly, at 316 the printer description table 14 is consulted to determine if the printer supports variable line spacing commands. If so, at 317 the test line is output to the printer using multiple printing passes by means of the variable line spacing controls to indirectly provide support for superscript and subscript printing. Such printing is shown in line 53 of FIG. 5. If variable line spacing controls are not supported by this printer, the test line of text may be output, at 318, with the superscript text being printed a whole line above the other text and the subscript text being printed on the same line as the other text.

At 319 the operator is prompted for a selection of the chosen one of the above described implementations for printing superscripts and subscripts. At 320 if the operator has selected the variable line spacing implementation demonstrated by the example of text line 53, the identifier for the variable line spacing routine is saved at location 12 in the random access memory. If the implementation associated with text line 53 is not chosen, at 323 a test is made to determine if the forward and reverse, half index technique attempted at text line 52 or the superscript/subscript controls implementation shown in text line 51 has been selected. If the superscript/subscript controls implementation is chosen, at 324 the identifier for this routine is stored at location 12 of the random access memory 11. If the forward and reverse, half index implementation attempted at text line 52 is chosen, at 325 the identifier for this routine is saved at location 12 of the random access memory 11.

The following programming design language listing is another form of the description of the above technique of establishing alternative implementations of a particular printer function for storage and presenting examples of these alternatives to an operator for choosing a preferred one of the techniques. This listing parallels the operation described above relative to the flow chart of FIG. 3.

```
IF superscript/subscript controls are in the table
THEN
  output test line 51 using superscript and
  subscript controls
ELSE
  output test line 51 using no controls
ENDIF
IF forward half index/reverse half index controls in
table THEN
  output test line 52 using forward and
  reverse half index controls
ELSE
  output test line 52 using no controls
ENDIF
IF variable line spacing controls in table THEN
  output test line 53 using variable line spacing
  and multiple passes
ELSE
  output test line 53 with superscript text
  printed
  1 line above other text
ENDIF
Prompt for user selection
IF line 53 selected THEN
  set multiple passes selected
ELSE
  IF line 51 selected THEN
    set superscript and subscript controls
    selected
  ELSE
    set forward and reverse ½ index selected
  ENDIF
ENDIF
```

Figure 4:
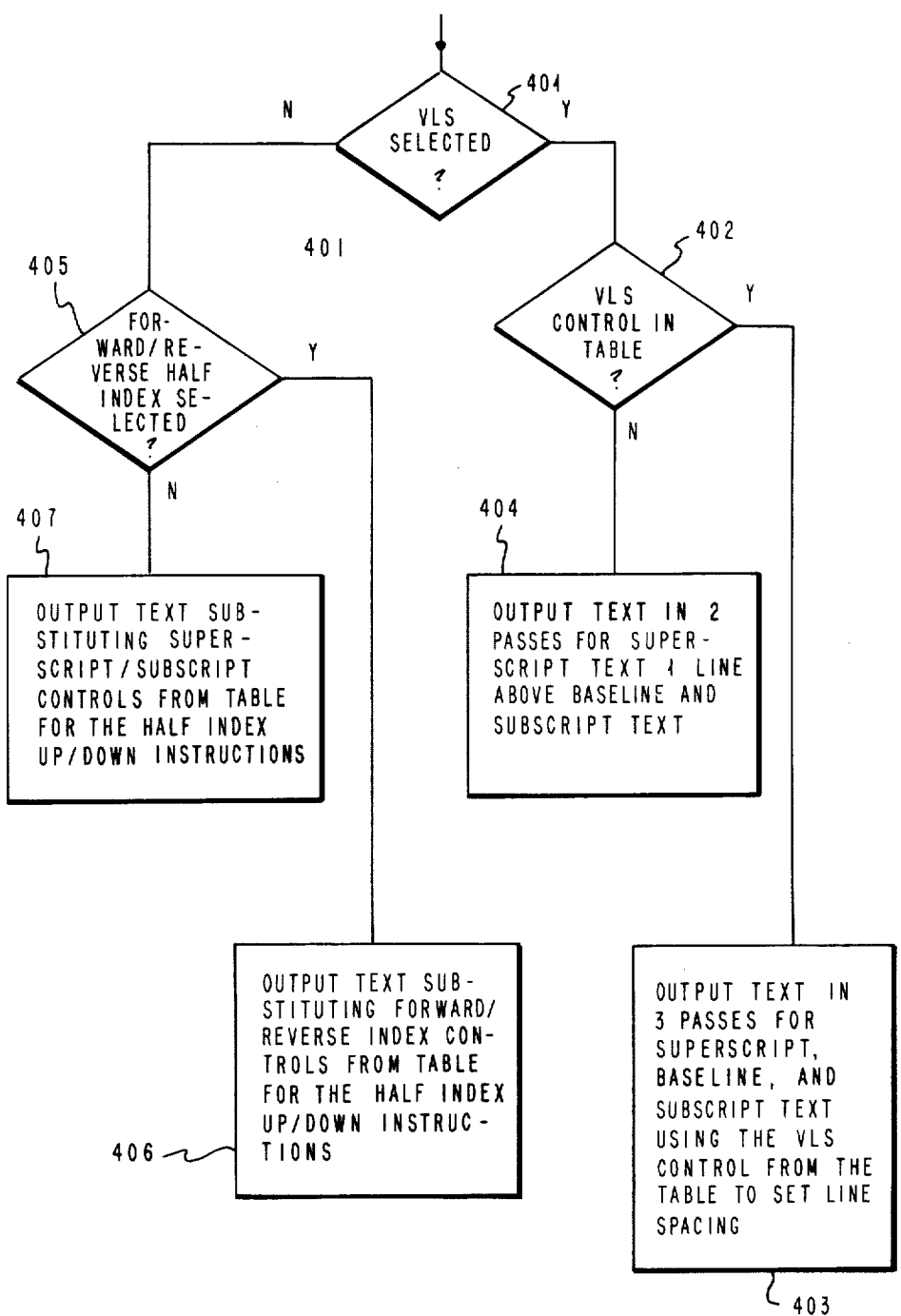
FIG. 4 is a programming flow chart which shows the specific operations performed in printing a line of text according to the several implementations of printing superscript and subscript text.

The flow chart depicted in FIG. 4 should now be considered with respect to the block diagram of FIG. 2. FIG. 4 shows the specific operations performed by the printer function control program 26 in printing a line of text according to a particular chosen implementation of the printing of superscripts and subscripts. In FIG. 4, at 401 location 12 of the random access memory 11 is interrogated to determine if the identifier associated with the variable line spacing implementation has been selected. If so, at 402 the printer description table at location 14 of the random access memory 11 is interrogated to determine if variable line spacing controls are resident in the table.

Assuming these controls are resident in the printer description table 14 and assuming that a data stream of an actual document to be printed is sent to the printer with half index up and half index down instructions for superscripts and subscripts in the data stream, the routine presently identified at location 12 in the random access memory 11 causes the half index up and half index down instructions in the data stream to be converted to variable line spacing controls so that printing of the text line occurs in multiple passes rather than in one pass. On the first pass, only the superscript text is printed. On the second pass, the "normal" line of text is printed and on the third pass the subscript text is printed. However, at 402 if variable line spacing controls were not found in the printer description table 14 of the random access memory 11, at 404 the half index up and half index down instructions in the text data stream are removed from the data stream and the text, including the superscripts and subscripts, is sent to the printer to be printed at the same level, on the same line.

At 401, if the identifier at location 12 of the random access memory 11 does not identify the variable line spacing technique, at 405 the identifier at location 12 of the random access memory 11 is tested to determine if the forward and reverse, half index implementation has been chosen. If so, the operation proceeds to 406 at which the data stream is sent to the printer substituting the forward and reverse half index controls from the printer description table 14 in place of the half index up and half index down instructions in the text data stream. This assumes that the printer supports half index up and down control codes. If it does not, the text is sent to the printer with the superscript text being printed a whole line above the other text and the subscript text being printed on the same line as the main text so that any subscript text will be indistinguishable from "normal" text.

If the forward and reverse, half index technique was not selected at 405, then at 407 the text is output to the printer substituting the superscript/subscript control codes from the printer description table 14 in place of the half index up and half index down instructions in the text data stream originally keyed by the operator to establish superscripts and subscripts.

The following programming design language listing is another form of the description of the above-described operations performed in printing a line of text according to the several implementations of printing superscript and subscript text. This listing parallels the operation described above relative to the flow chart of FIG. 4.

```
IF variable line spacing selected THEN
  IF variable line spacing control in table THEN
    output text in 3 passes for ½, baseline,
    and ½ down text using the variable line
    spacing control to set line spacing
  ELSE
    output text without the ½ up and down
    controls
  ENDIF
ELSE
  IF forward/reverse ½ index selected THEN
    output text substituting the for-
    ward/reverse ½ index controls from the
    table for the ½ up/down instructions
  ELSE
    output text substituting the super-
    script/subscript controls from the table
    for the ½ up/down instructions
  ENDIF
ENDIF
```

Another example of a printer function which may have alternative implementations associated with differing performance and appearance considerations is the printing of bold text. There are a variety of ways in which bold text can be printed. First, the printer might simply be caused to double strike the text characters intended to be printed boldly. An implementation to achieve even bolder ones of the characters desired to be printed boldly is to print the line on a first pass without any bold commands or controls and then boldly reprint the characters desired to be printed boldly directly over the positions in which they were printed on the first, normal pass. This requires a minimum of two printing passes and, possibly, three printing passes if the "bold" pass, itself, requires two passes. The performance degradation consideration here will be immediately understood, although the appearance may be highly desirable. Another alternative to printing bold text is to output the line normally and make a second printing pass of the same line printing those characters to be printed boldly in slightly displaced locations from the positions in which they were printed on the first pass.

The implementation for printing examples and choosing a particular implementation for printing bold characters is accomplished in a manner analogous to that described above with reference to FIG. 3. Control sequences for implementing alternative techniques for underscoring text are stored in the random access memory 11 as control sequences 4, 5, and 7. After the choice of implementing this function is made, an identifier associated with the chosen implementation is stored at location 15 in the random access memory 11 for reference during an actual printing operation in which bold text is to be printed.

Figure 6:
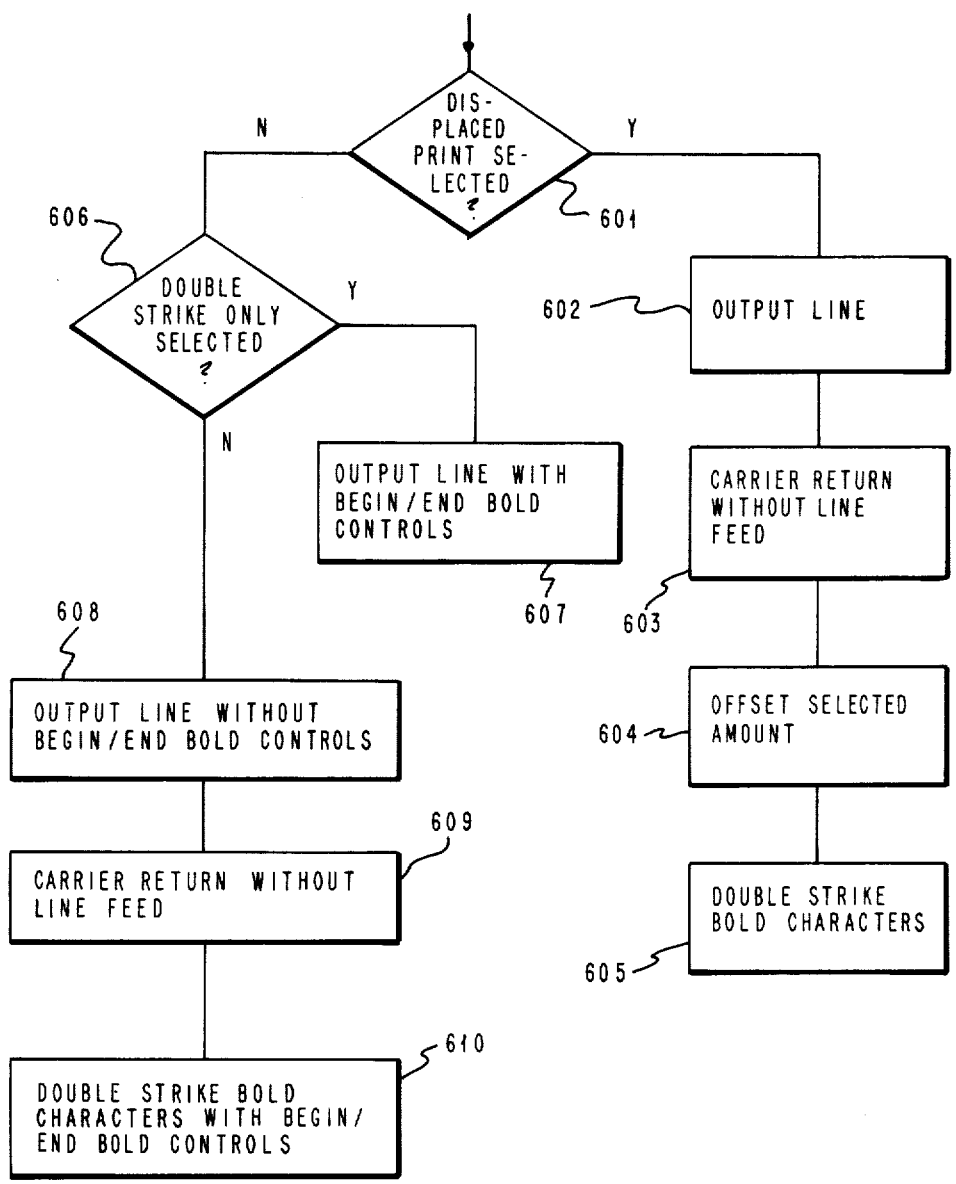
FIG. 6 is a programming flow chart which shows the specific operations performed in printing a line of text according to the several implementations of printing bold text.

Referring now to FIG. 6, and assuming that instructions are included in the text data stream delimiting one or more characters to be printed boldly, at 601 location 15 of the random access memory 11 is accessed to determine the choice of implementation of the routine for printing bold text. If "displaced" print is selected, at 602 the line of text is formatted to be sent to the printer normally, without special printing of the text to be printed boldly. At 603 a carrier return, without a line feed control, is included in this line formatting operation to allow a second printing pass of that line to be made. At 604 an offset escapement is added to the print carrier position to provide another printing pass at 605 in which only the characters to be printed boldly are printed in positions displaced from the positions in which they were printed in the printing pass formatted at 602, this displacement being determined at 604 by the amount selected during setup.

If, at 601 displaced print for bold characters was not selected the operation proceeds to 606. If the implementation of simply double striking the characters to be printed boldly has been selected, at 607 the line is output for printing with the begin and end bold control codes delimiting the text to be printed boldly. The more complex, non-displaced, double striking, bold printing mode takes the path through 608 through 610. Thus, at 606 if double strike only is not selected, at 608 the line is output to the printer without the begin and end bold control codes delimiting the text to be printed boldly. Then, at 609 a carrier return without a line feed is sent to the printer and at 610 only the characters to be printed boldly are sent to the printer, bounded by the begin and end bold control codes. This causes only those characters to be reprinted, but they are reprinted boldly by double striking in this operation at 610. Thus, it will be understood that with the path taken through 608-610 the characters to be printed boldly are actually struck three times, that is, one time on the first, normal printing pass without bold controls and twice more when the characters to be printed boldly are sent to the printer with the begin and end bold controls.

The following programming design language listing is another form of the description of the above-described operations performed in printing a line of text according to the several implementations of printing bold text. This listing parallels the operation described above relative to the flow chart of FIG. 6.

```
IF displaced print selected THEN
   output line
   carriage return without line feed
   offset selected amount
   double strike bold characters
ELSE
   IF double strike with bold selected THEN
      output the line without begin/end bold controls
      carriage return without line feed
      double strike bold characters with begin/end bold controls
   ELSE
      output line with begin/end bold controls
   ENDIF
ENDIF
```

Another example of a printer function which may have alternative implementations associated with differing performance and appearance considerations is the printing of underscored text. There are a variety of ways in which underscored text can be printed. For example, many word processing programs allow the operator to include begin and end underscore instructions in the text data stream which, if the printer supports such an operation, may provide for the insertion of begin and end underscore control codes into the print data in the places of the begin and end underscore instructions. With some printers, however, it is difficult to accomplish underscoring according to this technique when there are spaces to be underscored. A solution to this problem is to convert the spaces (with which there is sometimes difficulty controlling a printer to underscore) to a blank, escaping printer control character that the printer does not reject underscoring.

Another alternative to underscoring text is to send the appropriate sequence of underscore characters to the printer to be positionally placed appropriately relative to the text (including spaces) to be underscored. Here, the printing of a line including underscored text takes two printing passes without an intervening line feed. The speed is obviously slower than the approach described above but may provide for correctly underscored text in printers that neither support underscoring spaces or any other non-printing, escaping printer control codes.

The implementation for printing examples and choosing a particular implementation for underscoring text is accomplished in a manner analogous to that described above with reference to FIG. 3. Control sequences for implementing alternative techniques for underscoring text are stored in the random access memory 11 as control sequences 7 and 8. After the choice of implementing this function is made, an identifier associated with the chosen implementation is stored at location 16 in the random access memory 11 for reference during an actual printing operation in which underscored text is to be printed.

Figure 7:
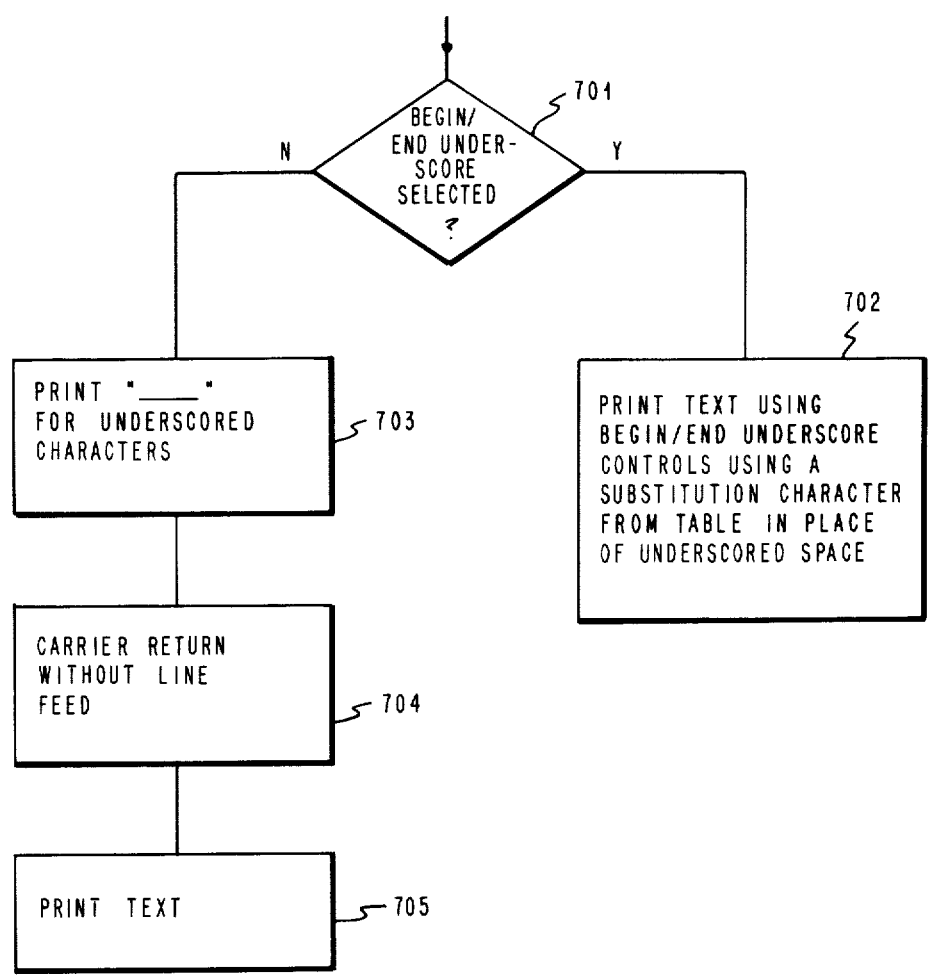
FIG. 7 is a programming flow chart which shows the specific operations performed in printing a line of text according to the several implementations of printing underscored text.

Referring now to FIG. 7, and assuming that instructions are included in the text data stream delimiting one or more characters to be underscored including spaces therebetween, at 701 location 16 of the random access memory 11 is accessed to determine the choice of implementation of the routine for underscoring text. If the use of begin and end underscore control codes is selected, at 702 the text is sent to the printer for printing with begin and end underscore control codes in the print data stream in place of the begin and end underscore instructions in the text data stream. Where spaces occur in the text delimited by the begin and end underscore instructions, a substitution character from the printer description table 14 is used in place of the spaces within the text bounded by the begin and end underscore instructions.

These substitution characters are escaping, non-printing control codes which accept underscoring.

At 701 if the identifier at location 16 of the random access memory 11 denotes an implementation in which begin and end underscore control codes will not be sent to the printer, at 703 an underscore line is sent to the printer positionally located for underscoring the characters bounded by the begin and end underscore instructions in the text data stream. At 704 the carrier is returned without a line feed and at 705 the entire text line is printed.

The following programming design language listing is another form of the description of the above-described operations performed in printing a line of text according to the several implementations of printing underscored text. This listing parallels the operation described above relative to the flow chart of FIG. 7.

```
IF begin/end underscore selected THEN
    print text using begin/end underscore controls.
    use a substitution character from the table for
    underscored characters
ELSE
    print '_' for underscored characters
    output carriage return without line feed
    print the text
ENDIF
```

While the invention has been shown and described with reference to particular embodiments thereof, it will be understood by those skilled in the art that the foregoing and other changes in form and details may be made therein without departing from the spirit and scope of the invention.

What is claimed is:

1. In a computer system including a printer, a method of causing said printer to execute a particular function in a particular manner, comprising:
    formatting in a memory and printing a plurality of example sequences of characters representative of the execution of said particular function, each example being printed according to one of a set of different formatting methods;
    saving in a storage of said computer system, data representative of an operator's choice of one of said formatting methods associated with said particular function; and
    formatting characters to be printed associated with said particular function which are subsequently sent from said computer to said printer, in accordance with said choice of said one of said formatting methods.

2. In the method of claim 1, further comprising saving in said storage of said computer system, one or more of said different formatting methods other than said operator's choice of said one of said formatting methods.

3. In the method of claim 1, further comprising saving in a memory of said computer system, each of said different formatting methods.

4. In the method of claim 1, wherein said step of saving said data representative of said operator's choice comprising saving an identifier of said operator's choice of said one of said formatting methods.

5. In the method of claim 1 wherein said particular function is printing superscript and subscript text.

6. In the method of claim 5 wherein one of said different formatting methods comprises:
    substituting a begin superscript control code in a printer data stream for a half index up instruction in a text data stream and an end superscript control code in said printer data stream for half a index down instruction in said text data stream when said half index up instruction in said text data stream is followed by one or more text characters followed by said half index down instruction.

7. In the method of claim 6 wherein said one of said different formatting methods further comprises:
    substituting a begin subscript control code in said printer data stream for said half index down instruction in said text data stream and an end subscript control code in said printer data stream for half said index up instruction in said text data stream when said half index down instruction in said text data stream is followed by one or more text characters followed by said half index up instruction.

8. In the method of claim 5 wherein one of said different formatting methods comprises:
    substituting reverse half index and forward half index printer control codes in a printer data stream for half index up and half index down instructions, respectively, in a text data stream.

9. In the method of claim 5 wherein one of said different formatting methods comprises:
    formatting a printer data stream in response to a half index up instruction followed by one or more text characters followed by a half index down instruction in a text data stream, said printer data stream including a first line to be printed comprising said one or more text characters followed by a variable line spacing control followed by a second line of text characters to be printed after said first line of characters.

10. In the method of claim 5 wherein one of said different formatting methods comprises:
    formatting a printer data stream in response to a half index down instruction followed by one or more text characters followed by a half index up instruction in a text data stream, said printer data stream including a first line of text to be printed followed by a variable line spacing control followed by a second line of text characters to be printed after said first line of characters, said second line of text characters consisting of said one or more text characters.

11. In the method of claim 1 wherein said particular function is printing bold text.

12. In the method of claim 11 wherein one of said different formatting methods comprises:
    formatting a printer data stream in response to a begin bold instruction followed by one or more text characters followed by an end bold instruction in a text data stream, said printer data stream including a first line of text to be printed including said one or more text characters followed by a carrier return without index control code followed by a second line of text characters to be printed after said first line of text, said second line of text characters consisting of said one or more text characters, and said second line of text being preceded by an escapement control code to cause said one or more text characters to overlie identical text characters in said first line of text with slight relative displacement therebetween.

13. In the method of claim 11 wherein one of said different formatting methods comprises:

substituting begin double strike and end double strike printer control codes in a printer data stream for begin bold and end bold instructions, respectively, in a text data stream.

14. In the method of claim 11 wherein one of said different formatting methods comprises:

formatting a printer data stream in response to a begin bold instruction followed by one or more text characters followed by an end bold up instruction in a text data stream, said printer data stream including a first line of text to be printed including said one or more text characters followed by a carrier return without index control code followed by a second line of text characters to be printed after said first line of text, said second line of text characters comprising said one or more text characters and having multiple-striking printer control codes associated therewith.

15. In the method of claim 1 wherein said particular function is printing underscored text including spaces.

16. In the method of claim 15 wherein one of said different formatting methods comprises:

substituting escaping, non-printing printer control codes, other than space codes, in a printer data stream for space codes in a text data stream.

17. In the method of claim 15 wherein one of said different formatting methods comprises:

formatting a printer data stream in response to a begin underscore instruction followed by one or more text characters including a space followed by an end underscore instruction in a text data stream, said printer data stream including a first line of text to be printed including said one or more text characters followed by a carrier return without index control code followed by a second line of underscore characters to be printed after said first line of text, said second line of underscore characters being proceded by an escapement control code to cause said one or more underscore characters to underlie said one or more text characters and said space.

* * * * *